(12) United States Patent
Kim et al.

(10) Patent No.: US 10,674,464 B2
(45) Date of Patent: Jun. 2, 2020

(54) METHOD AND DEVICE FOR SYNCHRONIZING FRAME NUMBERS BETWEEN DEVICE-TO-DEVICE COMMUNICATION SUPPORTED USER DEVICES

(71) Applicant: Samsung Electronics Co., Ltd., Gyeonggi-do (KR)

(72) Inventors: Wooseong Kim, Gyeonggi-do (KR); Kyeongin Jeong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 175 days.

(21) Appl. No.: 14/910,892

(22) PCT Filed: Aug. 8, 2014

(86) PCT No.: PCT/KR2014/007403
§ 371 (c)(1),
(2) Date: Feb. 8, 2016

(87) PCT Pub. No.: WO2015/020491
PCT Pub. Date: Feb. 12, 2015

(65) Prior Publication Data
US 2016/0192309 A1    Jun. 30, 2016

(30) Foreign Application Priority Data
Aug. 8, 2013   (KR) .................. 10-2013-0094246

(51) Int. Cl.
*H04W 56/00*   (2009.01)
*H04W 84/18*   (2009.01)

(52) U.S. Cl.
CPC ... *H04W 56/0015* (2013.01); *H04W 56/0025* (2013.01); *H04W 84/18* (2013.01)

(58) Field of Classification Search
CPC .......................... H04W 56/0015; H04W 84/18
See application file for complete search history.

(56) References Cited

U.S. PATENT DOCUMENTS

| 2005/0288040 A1 | 12/2005 | Charpentier et al. |
| 2009/0262713 A1 | 10/2009 | Terry |
| 2012/0265818 A1 | 10/2012 | Van Phan et al. |
| 2013/0077512 A1 | 3/2013 | Chang et al. |

(Continued)

FOREIGN PATENT DOCUMENTS

| JP | 2006-033820 | 2/2006 |
| KR | 1020130029355 | 3/2013 |

(Continued)

OTHER PUBLICATIONS

U.S. Appl. No. 61/830,602 (Year: 2013).*

(Continued)

*Primary Examiner* — Kodzovi Acolatse
*Assistant Examiner* — Farhad Ali
(74) *Attorney, Agent, or Firm* — The Farrell Law Firm, P.C.

(57) ABSTRACT

A method of synchronizing device-to-device terminals according to an embodiment of the present specification may comprise the steps of: matching timing synchronization with at least one terminal counterpart; and setting a frame number for device-to-device communication after the timing synchronization matching step.

6 Claims, 10 Drawing Sheets

(56) References Cited

U.S. PATENT DOCUMENTS

| | | | |
|---|---|---|---|
| 2013/0083779 A1 | 4/2013 | Ahn et al. | |
| 2013/0132502 A1* | 5/2013 | Stacey | H04W 56/0015 |
| | | | 709/208 |
| 2014/0099950 A1 | 4/2014 | Mildh et al. | |
| 2015/0009949 A1* | 1/2015 | Khoryaev | H04W 48/16 |
| | | | 370/330 |
| 2015/0126188 A1* | 5/2015 | Lindoff | H04W 8/005 |
| | | | 455/434 |
| 2015/0264588 A1 | 9/2015 | Li et al. | |
| 2016/0127881 A1* | 5/2016 | Kim | H04L 5/0032 |
| | | | 370/328 |

FOREIGN PATENT DOCUMENTS

| | | |
|---|---|---|
| KR | 1020150010434 | 1/2015 |
| WO | WO 2013002688 | 1/2013 |
| WO | WO 2015/137781 | 9/2015 |
| WO | WO 2015/143170 | 9/2015 |

OTHER PUBLICATIONS

PCT/ISA/210 Search Report issued on PCT/KR2014/007403 (pp. 4).
European Search Report dated Mar. 29, 2017 issued in counterpart application No. 14834818.8-1875, 8 pages.
Korean Office Action dated Jan. 22, 2020 issued in counterpart application No. 10-2013-0094246, 6 pages.

* cited by examiner

METHOD AND DEVICE FOR SYNCHRONIZING FRAME NUMBERS BETWEEN DEVICE-TO-DEVICE COMMUNICATION SUPPORTED USER DEVICES

TECHNICAL FIELD

Embodiments of the present disclosure relate to a method and apparatus for synchronizing frame numbers between terminals (user equipment) configured to support Device-to-Device (D2D) communication.

BACKGROUND ART

Mobile communication systems have been developed to provide a communication service to users while they are moving. With the rapid development of technology, mobile communication systems have been developed to provide data communication services at, a high speed as well as voice communication. Long Term Evolution (LTE)/LTE-Advanced (LTE-A)/that has recently been developed as a next generation mobile communication system is in the process of standardization by the $3^{rd}$ Generation Partnership Project (3GPP). LTE is a technology for implementing high speed packet-based communication with a transmission rate of maximum 100 Mbps. As a variety of services using wireless mobile communication systems have recently been created, this necessitates a new technology to efficiently support the services. Therefore, new methods and techniques are currently being researched with respect to LTE/LET-A systems.

Device-to-Device (D2D) Communication is a technique that has been recently explored and which enables direct communication between nearby terminals. A terminal may perform a discovery process to discover nearby terminals via the D2D communication technology, which is hereafter called 'D2D-D,' and then make direct communication with a corresponding nearby terminal, which is called 'D2D-C.' D2D communication which enables terminals to perform direct communication is more advantageous, in terms of the efficiency of wireless resources, than conventional communication which enables terminals to communicate with each other, using a conventional wireless network, via a base station. In addition, since D2D communication supports a method for supporting discovery between nearby terminals, it enables one terminal to provide necessary information to another nearby terminal directly, and thus support a Social Networking Service (SNS), advertising services, etc., thereby improving the efficiency thereof.

DISCLOSURE OF INVENTION

Technical Problem

Embodiments of the present disclosure provide a synchronization system for efficiently supporting Device-to-Device (D2D) communication.

Solution to Problem

In accordance with an aspect of the present invention, a synchronization method of a Device-to-Device (D2D) terminal is provided. The method includes: synchronizing with at least one correspondent terminal; and setting frame numbers for D2D communication, after synchronization.

In accordance with another aspect of the present invention, a synchronization apparatus of a Device-to-Device (D2D) terminal is provided. The apparatus includes: a D2D MAC layer for synchronizing with at least one correspondent terminal; and an SFN setting unit for setting frame numbers for D2D communication, after synchronization.

In accordance with another aspect of the present invention, a synchronization apparatus of a Device-to-Device (D2D) terminal is provided. The apparatus includes: a transceiver for transmitting/receiving signals to/from at least one correspondent terminal; and a controller for synchronizing with the at least one correspondent terminal and setting frame numbers for D2D communication, after synchronization.

Advantageous Effects of Invention

As described above, the synchronization system according to embodiments of the present disclosure is capable of efficiently supporting Device-to-Device (D2D) communication.

MODE FOR THE INVENTION

Figure 1:
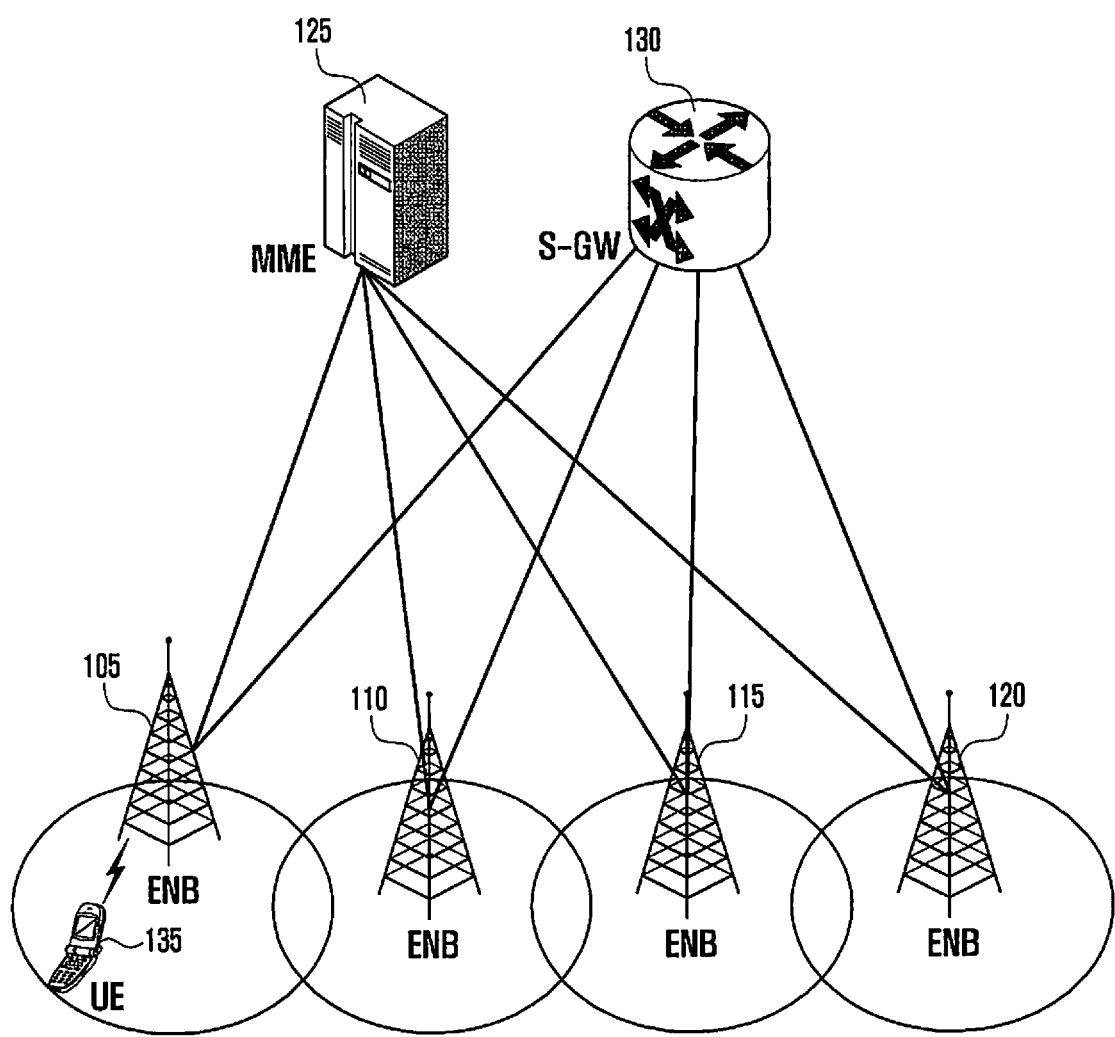
FIG. 1 is a diagram showing a configuration of a 3GPP LTE system according to embodiments of the present disclosure.

FIG. 1 is a diagram showing a configuration of a 3GPP LTE system according to embodiments of the present disclosure.

Referring to FIG. 1, the radio access network of the LTE mobile communication system includes next generation base stations (called evolved Node Bs, ENBs, or Node Bs) 105, 110, 115, and 120, a Mobility Management Entity (MME) 125, and a Serving-Gateway (S-GW) 130. A terminal or user equipment (UE) 135 is connected to an external network via ENB 105 and S-GW 130. ENBs 105 to 120 correspond to conventional Node Bs of the Universal Mobile Telecommunication System (UMTS). ENB 105 is connected to UE 135 via a wireless channel, performing more complicated functions than conventional Node B. In LTE system, since real-time services such as Voice over Internet Protocol (VoIP) and all user traffic are served via shared channels, apparatuses (devices) are required to collect information regarding states of UE devices and to make a schedule. This job is performed by ENBs 105 to 120. One ENB controls a number of cells. In order to implement a transmission rate of maximum 100 Mbps, LTE systems employ Orthogonal Frequency Division Multiplexing (OFDM), as a radio access technology (RAT), at a bandwidth of maximum 20 MHz. LTE systems also employ Adaptive Modulation & Coding (AMC) to determine modulation scheme and channel coding rate, meeting with the channel state of UE. The S-GW 130 is a device that provides data bearers. The S-GW 130 creates or removes data bearers according to the control of MME 125. The MME 125 performs a variety of control functions. The MME 125 connects to a number of ENBs 105 to 120.

Figure 2:
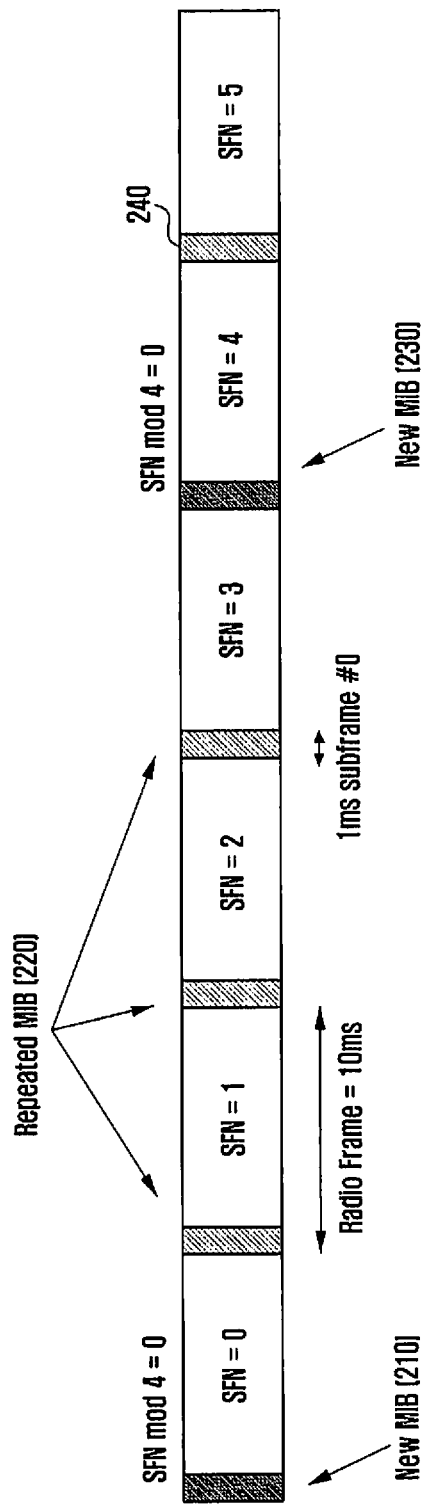
FIG. 2 is a diagram showing the frame structure used in a 3GPP LTE system according to an embodiment of the present disclosure.

FIG. 2 is a diagram showing the frame structure used in a 3GPP LTE system according to an embodiment of the present disclosure.

Referring to FIG. 2, the 3GPP LTE system uses time as a resource for the frame structure. The length of each radio frame is represented by 10 ms as shown in FIG. 2. Each radio frame includes 10 subframes of 1 ms in length each. One subframe is the least unit of radio resources scheduled by an ENB. A number of UE devices may be allocated radio resources from an eNB, via the subframes.

In the 3GPP LTE, UE uses two synchronization channels set to Subframe 0 and Subframe 5 in order to synchronize with the radio frame. Each of the synchronization channels includes a primary synchronization channel and a secondary synchronization channel, through each of which information is transmitted. The information includes a data structure or a sequence, designated by the ENB. Setting a synchronization channel to two types makes it possible for UE to easily distinguish between Subframe 0 and Subframe 5. Information transmitted through two synchronization channels may include values regarding an ENB identifier (indicator or checker) and sector information. Network entities are capable of extracting a physical layer cell identifier (Physical cell ID) through the two types of values.

When frames are synchronized via the procedure described above, UE preferentially receives, from the ENB, a physical layer broadcast channel to obtain system information containing the network information. The system information related to a network is broadcast from an ENB at a specific period of time, and requires a specific number designated to individual radio frames, i.e., the index, in order to detect a corresponding broadcast schedule.

In the 3GPP LTE, the number for a corresponding radio frame is called a system frame number (SFN). An SFN is periodically broadcast to UE via a broadcast channel of a physical layer. The SFN is included in a master information block (MIB). Information regarding a corresponding MIB is transmitted to UE via a broadcast channel in Subframe 0 of the radio frame as shown in FIG. 2. In order to ensure a relatively high reception rate for a broadcast channel of a corresponding physical layer, the broadcast channel is located near the synchronization channel.

The MIB system information containing the SFN is transmitted not every radio frame, but every four radio frames. That is, the MIB is transmitted every 40 ms. For the remaining three radio frames (SFN=1, 2, and 3), the MIB information 210 transmitted via the first radio frame (SFN=0) is repeatedly transmitted as repeated MIB 220 as shown in FIG. 2. Similarly, MIB 240 is a repetition of MIB 230 as shown in FIG. 2. Therefore, the ENB transmits the same MIB information repeatedly for four radio frames. A time point to transmit the first new MIB is the time (SFN=0, 4, 8, . . . ) when SFN mod 4=0 as shown in FIG. 2.

UE may obtain MIB information as it receives the MIB information once or as it integrates repeatedly transmitted MIP information signals, according to the reception channel state. After obtaining the SFN information via the reception of MIB, UE increase the SFN number by one, for each radio frame.

Figure 3:
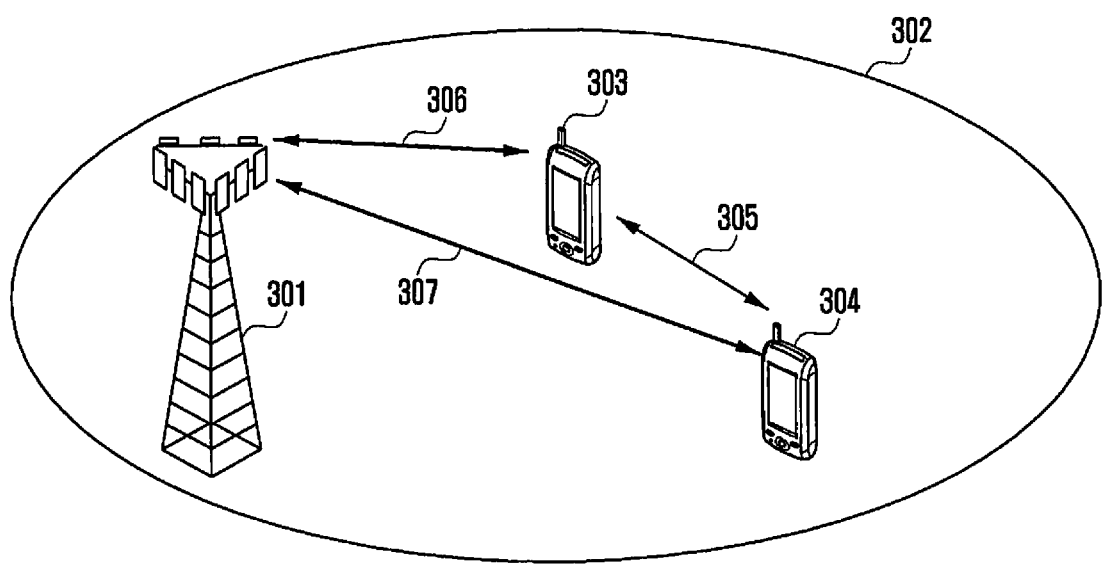
FIG. 3 is a diagram showing a configuration of a cellular system for D2D communication according to embodiments of the present disclosure.

FIG. 3 is a diagram showing a configuration of a cellular system for D2D communication according to embodiments of the present disclosure.

Referring to FIG. 3, the ENB 301 controls UE 303 and 304 within its cell coverage 302. The UE 303 performs cellular communication with the ENB 301 via a UE-to-ENB link 306. The UE 304 performs cellular communication with the ENB 301 via a UE-to-ENB link 307. When D2D communication between UE 303 and 304 is supported, the UE 303 and 304 may directly exchange information with each other via the D2D link 305, without using the ENB 301.

In the embodiment of FIG. 3, since the D2D UE devices 303 and 304 are within the cell, a transmission time of D2D communication, a time the D2D communication is performed may be synchronized with the downlink timing or uplink timing of the cell. In particular, when the time that D2D communication is performed is synchronized with the downlink timing of the cell, UE is capable of determining whether it performs a transmission operation or a reception operation during D2D communication via D2D resources of a frame, by using System Frame Number (SFN) information contained in system information broadcast within the cell. When UE does not distinguish between a D2D transmission time point and a D2D reception time point at the frame level, it needs to perform transmission and reception operations for all frames in the time domain, simultaneously and repeatedly, and this increases the power consumption. In addition, when the UE is a type of UE which is not capable of simultaneously performing D2D transmission and reception operations for the same resource (e.g., a half-duplex terminal), it does not perform D2D communication or, although it may perform D2D communication, it will perform D2D communication at a very low efficiency.

Unlike the embodiment shown in FIG. 3, when part or all of the UE devices are out of the cell coverage, the D2D UE devices cannot use synchronization channels transmitted from the ENB. Therefore, the D2D UE devices need to perform a D2D synchronization procedure therebetween. In addition, since the UE devices do not receive SFN information containing system information broadcast within the cell, they cannot make a schedule for D2D communication by using the SFN. The embodiment of the present disclosure provides a method in order to resolve the problem.

Although the following embodiments are described in such a way that SFNs match with each other for the synchronization between UE devices, it should be understood that frame number/synchronization number, number specifying a unit of time such as a frame for synchronization, etc. may be used, instead of SFN.

Figure 4:
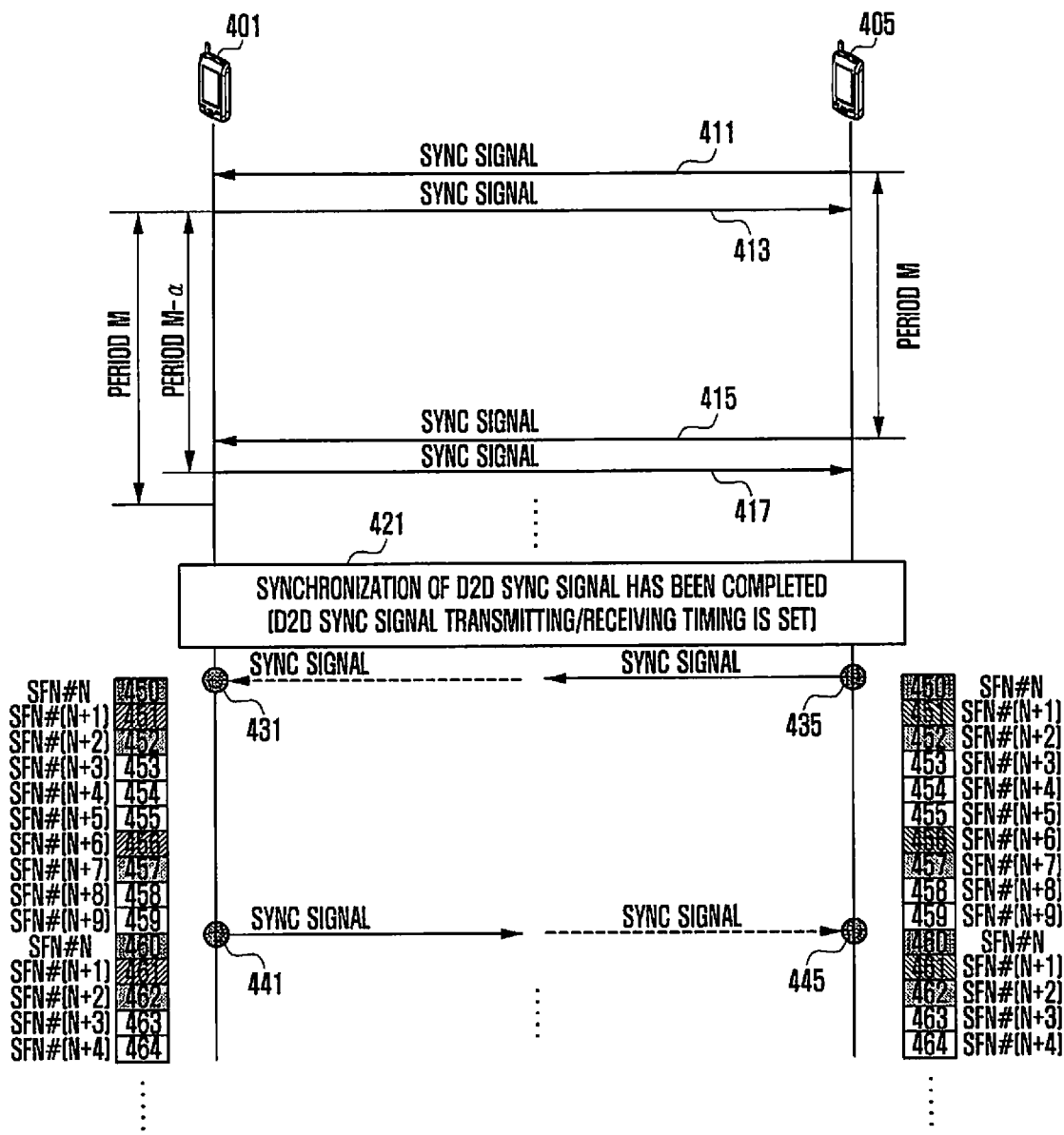
FIG. 4 is a flow diagram showing a frame number synchronization method according to a first embodiment of the present disclosure.

FIG. 4 is a flow diagram showing a frame number synchronization method according to a first embodiment of the present disclosure.

Referring to FIG. 4, UE devices 401 and 405 are capable of supporting/performing D2D communication (and also called D2D communication UE devices, D2D UE, or D2D UE devices 401 and 405). The D2D UE devices 401 and 405 transmit/receive a D2D synchronization (SYNC) signal designed for D2D communication to/from each other. The D2D SYNC signal allows the D2D UE devices 401 and 405 to perform the subframe synchronization and the frame synchronization therebetween. The D2D SYNC signal may also notify D2D UE devices of the presence of D2D UE devices in the D2D communication area.

The UE devices 401 and 405 transmit D2D SYNC signals at timing points set by the local clocks, respectively. As shown in FIG. 4, the D2D UE devices 401 and 405 may not be synchronized with each other at transmission times 411 and 413 when they transmit the first D2D SYNC signals. That is, the D2D UE devices 401 and 405 transmit the D2D SYNC signals to each other at different timing points. When one of the UE devices 401 and 405 receives a D2D SYNC signal from the other, it detects that they are not synchronized. In this case, one UE device re-sets its timing with the received D2D SYNC signal and transmits the next D2D SYNC signal to the other UE device. When the timings between UE devices within a D2D communication area are not synchronized with a single attempt to adjust timing synchronization, the UE devices repeat the synchronization procedure until their timings are synchronized with each other.

In the embodiment shown in FIG. 4, it is assumed that UE 401 resets its timing to that of the D2D SYNC signal received from UE 405 and transmits the following D2D SYNC signal to the UE 405. A D2D SYNC signal may be periodically transmitted at a period of time M. However, the UE 401 sets the timing to that of the D2D SYNC signal received from the UE 405 in operation 411, and may transmit the following D2D SYNC signal to the UE 405 at the timing (M-a) in operation 417. α refers to an offset to synchronize the timing between D2D UE devices. For example, the SYNC signal in operation 411 is transmitted earlier by x milliseconds than a SYNC signal in operation 413, a may be x milliseconds or a value similar thereto.

When the timing synchronization between UE devices within a D2D communication area is not achieved with one timing adjustment, the synchronization procedure described above may be repeated until the timing synchronization between the D2D UE devices is completed in operation 421.

D2D UE devices in a D2D communication area set the transmission/reception timings of the D2D SYNC signal through the timing synchronization and have the same subframe and frame timing synchronization. A half-duplex UE device is capable of transmission and reception but only one of them at a time. That is, a half-duplex UE device does not simultaneously perform the transmission and reception of a D2D SYNC signal. Therefore, a half-duplex UE device may alternatively perform the transmission and reception of a D2D SYNC signal in the time domain. For example, after transmitting a D2D SYNC signal, one UE device does not transmit a D2D SYNC signal, but instead receives a D2D SYNC signal from another UE device after a period of time M has elapsed. From that point forward, the UE device performs the transmission of a D2D SYNC signal in every time period M.

Although the embodiment is described based on a half-duplex UE device, it may also be applied to full-duplex UE devices. A full-duplex UE device is capable of simultaneously transmitting its SYNC signal and receiving a SYNC signal to/from another UE device at a SYNC signal transmission or reception timing point. In this case, UE 405 is capable of simultaneously receiving a SYNC signal and transmitting a SYNC signal every SYNC signal transmission/reception period, without alternatively performing the transmission or reception, as in operations 435 and 445. The operations from 411 to 421 may in total be called a timing synchronization procedure, and this will be applied in the same way to the following description.

Before ascertaining that the D2D timing synchronization has been completed in operation 421, UE devices 401 and 405 continue to receive D2D SYNC signals from opposite UE devices except for a time point that they transmit D2D SYNC signals. When the D2D timing synchronization has been completed in operation 421, UE devices 401 and 405 perform D2D communication. UE devices 401 and 405 perform a D2D transmission operation using a D2D resource of a specific frame or a D2D reception operation by using a D2D resource of a specific frame (or another specific frame). When UE devices 401 and 405 consider the D2D timing synchronization to have been completed in order to detect a specific frame in operation 421, a frame corresponding to a D2D SYNC signal transmitting/receiving time point is fixed to SFN # N in operations 431 and 435. As shown in FIG. 4, when N is set to '0', the frame 450 corresponding to a D2D SYNC signal transmitting/receiving time point may be fixed to SFN #0. After that, the SFN value may be increased every 10 ms by the internal clock of UE. For example, when the frame 450 corresponding to a D2D SYNC signal transmitting/receiving time point is considered to be SFN #0, the following frame 451 after 10 ms is considered to be SFN #1; the following frame 452 after 10 ms is considered to be SFN #2; and the following frame 459 after 70 ms is considered to be SFN #9. In the embodiment shown in FIG. 4, the maximum SFN number is 9. Therefore, after SFN #9, the frame 460 corresponding to the following D2D SYNC signal transmitting/receiving time point 441 or 445 is returned to SFN #0. After that, the following frame 461 after 10 ms is considered to be SFN #1; the following frame 462 after 10 ms is considered to b SFN #2; and the following frame 464 after 20 ms is considered to be SFN #4.

As described above, as a frame corresponding to a D2D SYNC signal transmitting/receiving time point is considered to be a fixed value, SFN # N (e.g., SNF #0), etc., the SFN value may be creased every 10 ms by the internal clock of UE. Therefore, although signaling for an explicit SFN value every frame is not performed, UE devices can detect the SFN value corresponding to every frame and synchronization for the SFN value can also be achieved between D2D UE devices. For example, as shown in FIG. 4, when UE 401 performs: the D2D transmission using a D2D resource of a frame satisfying SFN mod 5=1; and the D2D reception using a D2D resource of a frame satisfying SFN mod 5=2, frames 451 and 461 are SFN #1 and frame 456 is SFN #6. This case corresponds to the transmission frame. Therefore, the embodiment of the present invention enables UE 401 to perform a D2D transmission operation. In addition, frames 452 and 462 are SFN #2 and frame 457 is SFN #7. This case corresponds to the reception frame. Therefore, the embodiment of the present invention enables UE 401 to perform a D2D reception operation. For the other frames, the UE 401 may not perform any D2D transmission/reception operation. Information as to which frame UE uses a resource of for D2D transmission or D2D reception may be pre-set to the UE by a core network or other network entities. For example, a UE dedicated message from a D2D server or system information that an ENB broadcasts in the cell may be used to indicate the use of a frame resource.

The setup information may contain values of N and M for configuring a condition SFN mod N=M or bitmap information. The bitmap information may be a bitmap of 40 bits, indicating whether it is used as a resource for D2D transmission and reception for subframe (40 in total) contained in each of four frames. The pattern of four frames may be formed in such a way that it starts from SFN #0 and is then repeated; or it starts from SFN # K offset by K from SFN #0 and is then repeated. In this case, the setup information may contain the value of K.

The setup information related to the representation or equations indicating a frame used for a D2D transmission/reception resource may be signaled. In the embodiment shown in FIG. 4, unlike UE 401, UE 405 performs: the D2D reception using a D2D resource of a frame satisfying a condition SFN mod 5=1; and the D2D transmission using a D2D resource of a frame satisfying a condition SFN mod 5=2.

Although the embodiment of FIG. 4 is implemented in such a way that, after the D2D synchronization has been completed, a specific value of SFN (e.g., SFN #0) is fixed to a frame corresponding to a D2D SYNC signal transmitting/receiving timing point, it may be modified in such a way that a preset number value of SFN is fixed to a frame corresponding to a timing point that a signal or channel is transmitted/received, instead of a D2D SYNC signal transmitting/receiving timing point.

Figure 5:
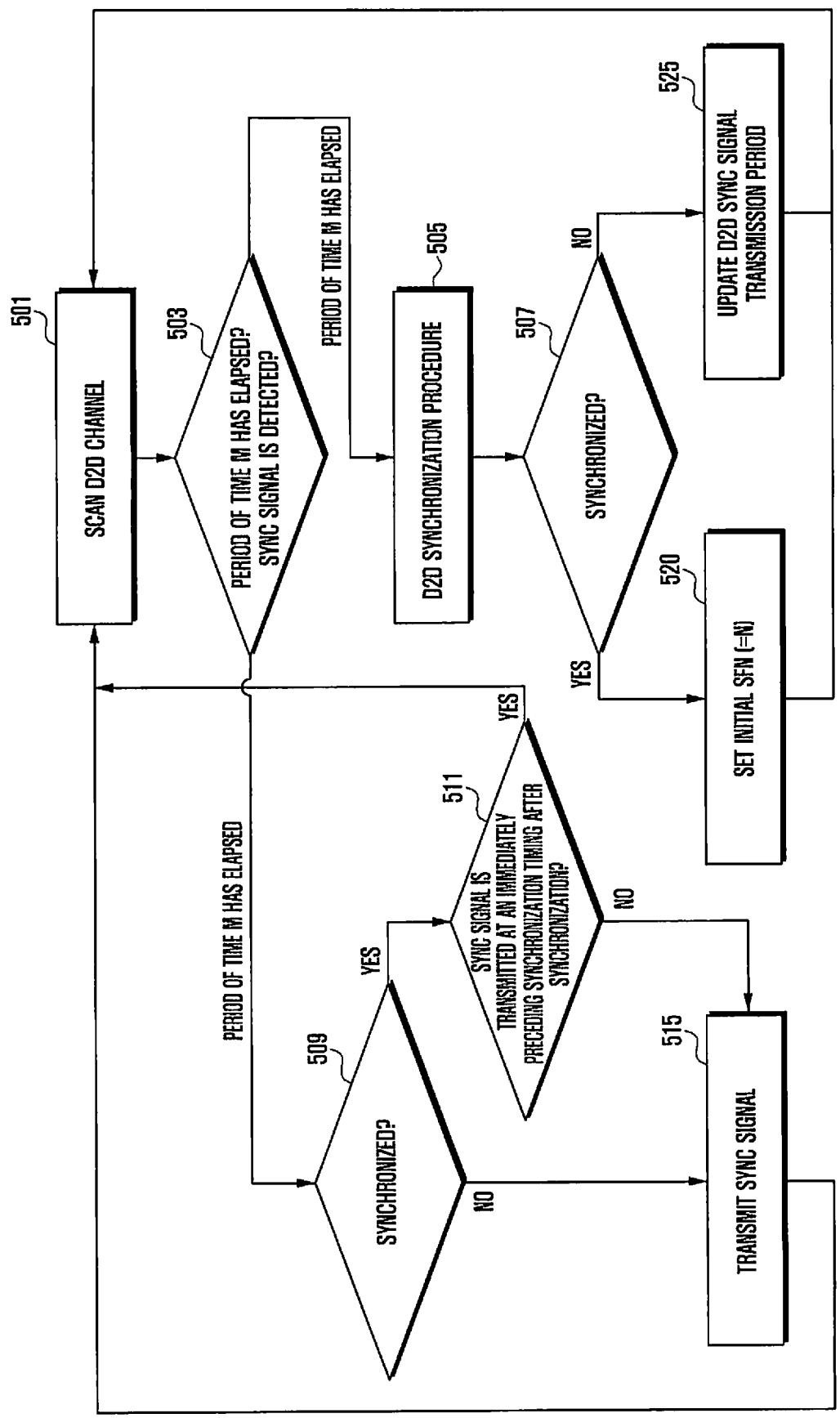
FIG. 5 is a flow diagram showing a synchronization method according to a first embodiment of the present disclosure.

FIG. 5 is a flow diagram showing a synchronization method according to a first embodiment of the present disclosure.

Referring to FIG. 5, in order to enable UE devices to perform D2D communication, the SFN synchronization between the UE devices is performed in such a way that: a D2D synchronization channel is established and a specific value of SFN is designated. Therefore, UE devices do not perform an agreement procedure for setting a specific value of SFN or a process for receiving a specific SFN channel. FIG. 5 shows a flow diagram that describes an SFN synchronization procedure for D2D UE devices to perform D2D communication.

While monitoring a particular frequency band set for a D2D channel, D2D UE detects a D2D SYNC signal from the nearby D2D UE in operation 501. The UE may sense a corresponding frequency band every preset time period in order to reduce power consumption. The D2D SYNC signal is transmitted via a D2D Synch channel (D2DSS) and has a specific period of time. The D2D SYNC signal has a preset pattern. The D2D SYNC signal is designed to be orthogonal to a D2D SYNC signal of the nearby UE, thereby interfering as little as possible with the SYNC signal of the nearby D2D UE. In addition, the SYNC signal received via a corresponding synchronization channel is designed in such a way as to efficiently sense signals with a relatively high level of autocorrelation. A code or sequence used for the SYNC signal may be set to vary according to individual UE devices or a group of UE devices. In this case, corresponding sequences or code array may represent meanings that differ from each other. For example, the priority of SYNC signal may be determined according to indexes of sequences. When this is preset, the priority of SYNC signal may be detected via a code book or sequence index list stored in individual UE devices. When a number of UE devices in group need to synchronize their frames in order to perform group communication therebetween, a SYNC signal with the highest priority in the sequence is set to a master clock, and then the other UE devices synchronize their internal clocks with the master SYNC signal.

The UE device determines whether a preset period of time M has elapsed or a SYNC signal of another UE device is detected in operation 503. When the UE device ascertains that a SYNC signal of another UE device is detected in operation 503, it proceeds with operation 505. When the D2D UE device receives the D2D SYNC signal from the nearby D2D UE device, it identifies the SYNC signal via the autocorrelation of the corresponding signal and assumes that the D2D frame is synchronized at the peat of the corresponding signal in operation 505. The UE device identifies the SYNC signal, and determines whether the synchronization time point is identical to a transmission time point of the received SYNC signal in operation 507. When the UE device ascertains that the synchronization time point is not identical to a transmission time point of the D2D transmission UE in operation 507, it reduces the period of transmission of a SYNC signal by an offset value, described above referring to FIG. 4, in order to synchronize D2D frames in operation 525. Since the reduction of the period of transmission is a temporary process, the reduced period of transmission will be returned to the original period value M after the period of time has elapsed for the next transmission. The UE device may adjust the following SYNC signal transmitting/receiving time point by a corresponding offset value to match the SYNC signal transmitting/receiving time point with the following SYNC signal receiving time point of another UE device. After that, the D2D UE device repeats the scanning operation in operation 501, in order to receive the following D2D SYNC signal. As the transmission/reception of D2D SYNC signals is repeated as described above, the D2D frame difference between the UE devices is reduced, and the D2D frames between the UE devices are thus synchronized.

When the UE device ascertains that the synchronization time point is identical to a SYNC signal transmitting/receiving time point of another UE device in operation 507, it proceeds with the following operation 520. When the D2D frames are synchronized via the synchronization procedure described above in operation 520, UE devices set SFN of a corresponding frame to a preset value N (e.g., N=0). After that, the individual D2D UE devices increase the value of SFN by one every 10 ms. In this case, the values of SFN are N+1, N+2, N+3, . . . .

The UE device is scanning D2D channels, and simultaneously needs to transmit a D2D SYNC signal at a D2D SYNC signal transmitting period M in operation 503. The UE device sets a timer with a D2D SYNC signal transmitting period M by using the internal clock, and broadcasts a D2D signal selected by a corresponding UE device via a D2D channel at a corresponding time. When the period of time M has elapsed, the UE device proceeds with the following operation 509.

A half-duplex UE device is not capable of simultaneously performing transmission and reception in the D2D synchronization channels. Therefore, the UE device determines whether the current state is a synchronous state where D2D communication is performed or an asynchronous state where D2D communication is not performed in operation 509. When the UE device ascertains that the current state is an asynchronous state in operation 509, it transmits a corresponding D2D SYNC signal in operation 515. On the other hand, when the UE device ascertains that the current state is a synchronous state in operation 509, it determines whether a SYNC signal is received or transmitted via a synchronization channel of an immediately preceding D2D frame (at an immediately preceding SYNC signal transmission/reception time point) in operation 511. In the embodiment shown in FIG. 4, the UE device alternates between the transmission and reception via a D2D synchronization channel after the D2D synchronization has been achieved. That is, since the D2D UE devices operate based on half-duplex communication, they perform TDM transmission and reception. That is, when UE needs to perform a transmission operation, it previously ensures a control authority for transmission via a channel and broadcasts signals via allocated wireless resources, for a preset period of time. In addition, when UE needs to perform a reception operation, it must be in a state where it does not perform a transmission operation. To this end, the UE device performs a regulation operation with a corresponding reception UE device and enables the reception UE device to monitor the channel for a preset period of time. When the UE ascertains that a SYNC signal is transmitted via an immediately preceding D2D synchronization channel in operation 511, it proceeds with operation 501 and performs a D2D channel scanning operation. On the other hand, when the UE ascertains that a SYNC signal is not transmitted via an immediately preceding D2D synchronization channel in operation 511, it transmits its D2D SYNC signal in operation 515.

In a state where the D2D synchronization procedure has been performed and D2D communication is maintained, the synchronization difference may not be induced greater than or equal to a D2D frame when the D2D synchronization procedure is performed via the alternation process. Therefore, a fine synchronization correction procedure may be performed for the received SYNC signal. Accordingly, the SFN re-configuration is not required. However, when a relatively large error in D2D synchronization (e.g., greater than or equal to the half of a frame in length, i.e., greater than or equal to 5 ms, where a threshold to determine an error may be set according to system designs) occurs due to a sudden movement of a D2D UE device or a change in speed, the UE device ascertains that it has not been synchronized with other UE device in operation 505 and then performs the synchronization procedure in operation 525. After that, when frames are synchronized, the value of SFN is initialized and then set.

Figure 6:
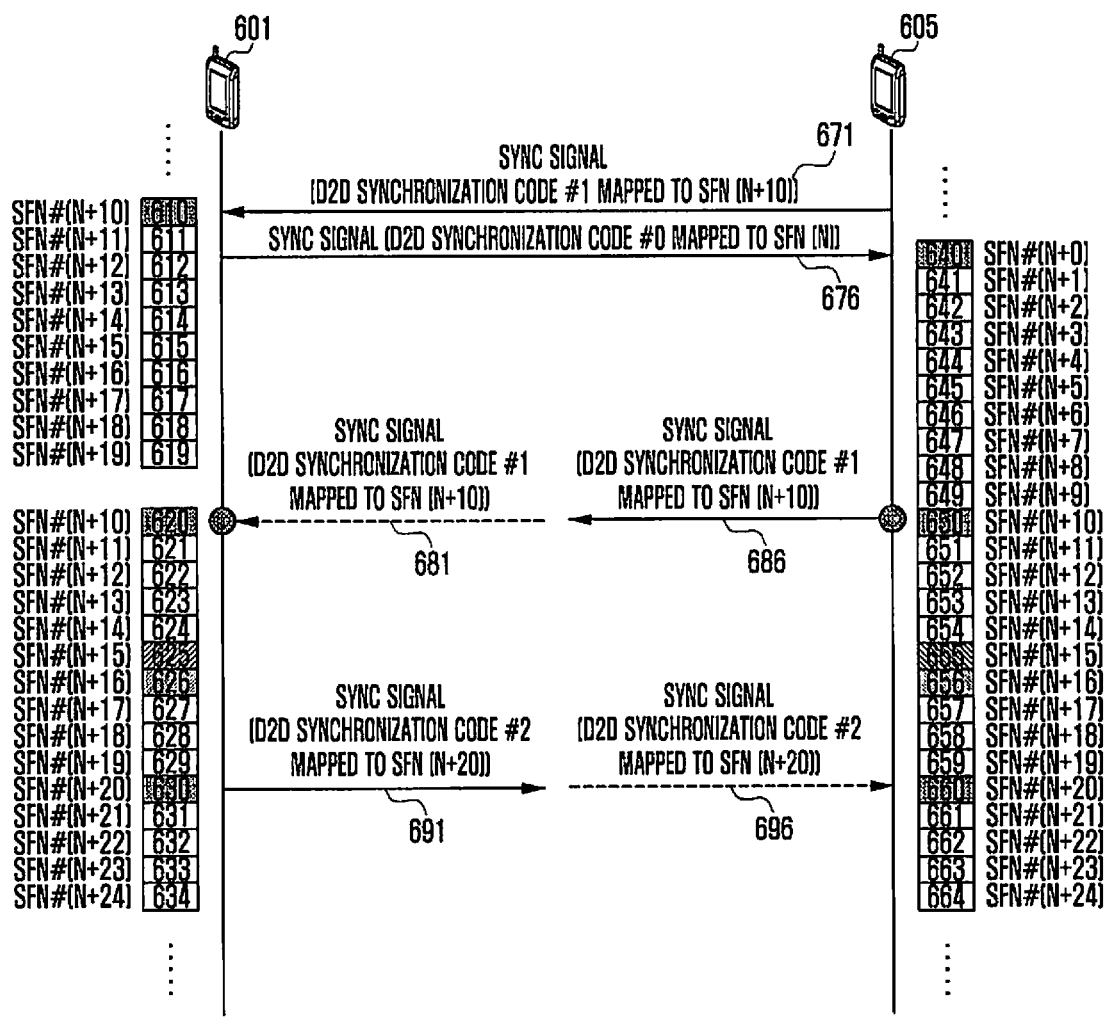
FIG. 6 is a flow diagram showing a synchronization method according to a second embodiment of the present disclosure.

FIG. 6 is a flow diagram showing a synchronization method according to a second embodiment of the present disclosure.

Referring to FIG. 6, UE devices 601 and 605 are capable of supporting/performing D2D communication (and also called D2D communication UE devices, D2D UE, or D2D UE devices 601 and 605). The embodiment of FIG. 6 will be partially similar to that of FIG. 4, and also be described referring to FIG. 4.

The D2D UE devices 601 and 605 transmit/receive a D2D synchronization (SYNC) signal designed for D2D communication to/from each other in operations 671 and 676. The D2D SYNC signal allows the D2D UE devices 601 and 605 to perform the subframe synchronization and the radio frame synchronization therebetween. The D2D SYNC signal may also notify D2D UE devices of the presence of D2D UE devices in the D2D communication area.

The second embodiment of FIG. 6 differs from the first embodiment of FIG. 4 in that the second embodiment uses D2D SYNC codes mapped to SFN, as a D2D SYNC signal. Referring to FIG. 6, SYNC signals 671 and 676 use SYNC codes mapped to SFN (N+10) and SFN (N). The UE devices 601 and 605 transmit D2D SYNC signals including the SYNC codes at timing points set by the local clocks, respectively.

Like the embodiment of FIG. 4, the D2D UE devices 601 and 605 may not be synchronized with each other at the first D2D SYNC signals. In this case, when the UE devices receive D2D SYNC signals from each other, they recognize that the current timing synchronizations are out of phase. Therefore, the individual UE devices re-set the SYNC signal transmitting/receiving timing points to the received D2D SYNC signals to be synchronized with each other, respectively, and then transmit the following D2D SYNC signals to each other. When the timings between UE devices within a D2D communication area are not synchronized with a single attempt to adjust timing synchronization, the UE devices repeat the synchronization procedure until their timings are synchronized with each other.

In the embodiment shown in FIG. 6, it is assumed that UE 601 matches its timing with that of the D2D SYNC signal received from UE 605 and transmits the following D2D SYNC signal to the UE 605. The embodiment of FIG. 4 or the embodiment of FIG. 6 is implemented in such a way that two UE devices are adjusted to transmit/receive the SYNC signal to/from each other at the same timing. It should be understood that the method of adjusting the timing may be varied according to which one of the two UE devices starts in one of the timing adjusting directions.

For example, a D2D SYNC signal may be periodically transmitted at a period of time M. Like the embodiment of FIG. 4, the UE device may calculate a time point to transmit the following D2D SYNC signal by applying an offset to the received D2D SYNC signal timing. When the timings between UE devices within a D2D communication area are not synchronized with a single attempt to adjust timing synchronization, the UE devices repeat the synchronization procedure until their timings are synchronized with each other as describe in the embodiment Referring to FIG. 4.

After synchronizing the timing by transmitting SYNC signals a number of times in operations 681 and 686, the D2D UE devices 601 and 605 may agree on the SFN information regarding their D2D SYNC signals. In the embodiment of FIG. 6, when one UE device receives a D2D SYNC signal from the other UE device in order to make an SFN synchronization, it identifies a timing synchronization and a corresponding D2D synchronization code included in the received SYNC signal, thereby identifying information regarding SFN of the other UE device. The SYNC signal of the initial D2D SYNC signal in operations 671 and 676 includes synchronization codes corresponding to different SFNs such as N+1 and N. In addition, since the D2D SYNC signal may include a code having the frequency orthogonality, the UE device may receive a number of SYNC signals from a synchronization channel and thus ascertain that there are a number of nearby D2D UE devices through the received SYNC signals. In addition, there may be a number of SFNs mapped to corresponding SYNC signals. After that, the UE devices 601 and 605 execute SFN synchronization based on the determined agreement rule and transmit the synchronizations to each other. For example, in the embodiment of FIG. 6, when SFN information items included in the D2D SYNC signals are not identical to each other, the individual UE devices may match their synchronizations to one of the SFN values, smaller than the other, where the SFN values are received from the correspondent UE devices, in operations 681 and 686. The D2D SYNC signal transmitting/receiving time points are matched between the D2D UE devices in a D2D communication area through the timing synchronization between D2D UE devices, so that the UE devices have the same Subframe and frame timing synchronization. Since a half-duplex UE device is capable of transmission and reception but only one of them at a time, that is, a half-duplex UE device does not simultaneously perform the transmission and reception of a D2D SYNC signal, it may alternatively perform the transmission and reception of a D2D SYNC signal in the time domain. For example, after transmitting a D2D SYNC signal, one UE device not transmits a D2D SYNC signal but receives a D2D SYNC signal from another UE device after a period of time M has elapsed. Since then, the UE device performs the transmission of a D2D SYNC signal every a period of time M.

In order to synchronize SFN between nearby D2D UE devices, the synchronization may be set to a small value of SFN as described above. The UE device alternates between the transmission and reception according to a period M and determines whether the value of the received SFN is identical to that of the currently used SFN. When the second period M arrives and D2D synchronization code is mapped to a value corresponding to SFN (N+2), the SFNs are identical to each other in the UE devices 601 and 605 in operations 691 and 696. That is, due to the transmission of an alternation SYNC signal created in the SFN synchronization procedure, it is necessary to determine whether the UE is synchronized with the SFN of the correspondent UE device. For example, while the D2D UE device 601 has a smaller value of SFN, when the D2D SYNC signal transmitted from the UE device 605 is identical to the SYNC signal of the UE device 601 or the value of the SFN of the UE device 605 is greater than that of the UE device 601, the UE device 601 needs to transmit the SFN to the following D2D synchronization channel. However, since the correspondent D2D UE device 605 does not know whether its SFN is identical to the SFN of the UE 601, it cannot initiate D2D communication. Therefore, as shown in FIG. 6, UE devices may recognize that the synchronization procedure has been completed when receiving the same code value, i.e., the same SFN, from each other, via the first SYNC signals 681 and 686 and the second SYNC signals 691 and 696. Therefore, a UE device based on half-duplex communication needs to check the SFN synchronization with the correspondent UE device through at least two instances of handshake.

Although the embodiment is described based on a half-duplex UE device, it may also be applied to full-duplex UE devices. A full-duplex UE device is capable of simultaneously transmitting its SYNC signal and receiving a SYNC signal to/from another UE device at a SYNC signal transmission or reception timing point. In this case, UE 605 is capable of simultaneously receiving a SYNC signal and transmitting a SYNC signal every SYNC signal transmission/reception period, without alternatively performing the transmission or reception, as in operations 686 and 696.

The configuration of FIG. 6 is characterized in that information indicating the SFN of the transmission UE device is included in the SYNC signal transmitted by the transmission UE device. When a reception UE device receives the SYNC signal from the transmission UE device, it is capable of extracting the SFN of the transmission UE device from the SYNC signal, and updating the SFN of the reception UE device.

Figure 7:
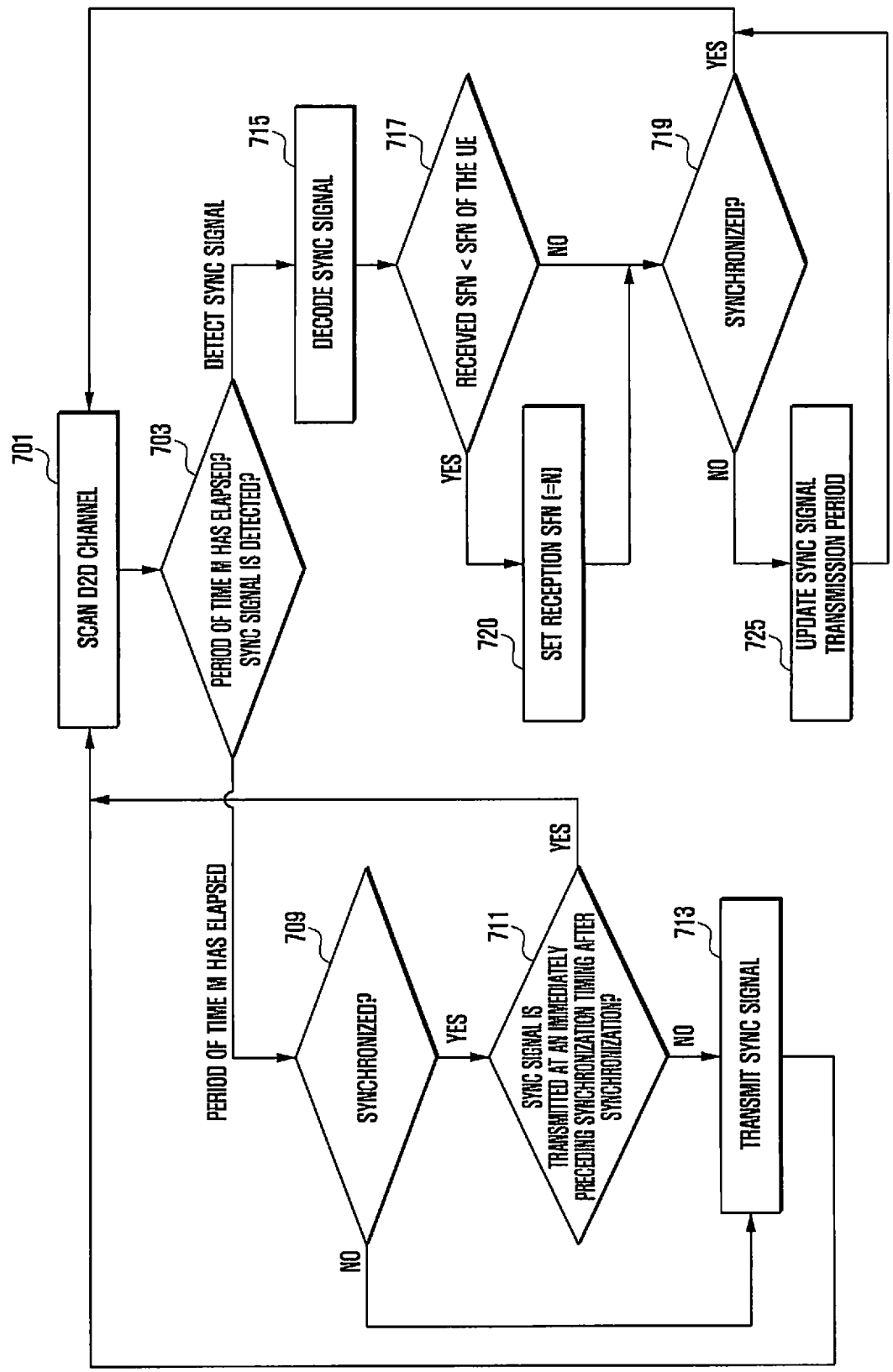
FIG. 7 is a flow diagram showing a synchronization method according to a second embodiment of the present disclosure.

FIG. 7 is a flow diagram showing a synchronization method according to a second embodiment of the present disclosure.

Referring to FIG. 7, the operations of UE devices descried in the embodiment referring to FIG. 6 are performed to synchronize SFNs by using the SFN mapping process for synchronization code values used as D2D SYNC signals. FIG. 7 shows a flow diagram of the operations of a corresponding UE device. The UE device scans frequencies to receive SYNC signals transmitted from the nearby D2D UE devices in operation 701. The UE device must contain information regarding frequencies used for D2D channels.

As described above referring to FIG. 5, the D2D UE device transmits a specific code via a synchronization channel, thereby ensuring synchronization with the nearby D2D UE devices. The code of the D2D UE device has a D2D SYNC signal characteristic. Therefore, D2D SYNC signals that differ from each other have the orthogonality characteristic, thereby minimizing the interference therebetween. Accordingly, D2D SYNC signals have a relatively high level of autocorrelation, making them ideal for detection and performance of the D2D synchronization. The priority may be mapped according to the code value or sequence used for the individual signals. In this case, when a number of UE devices need to perform group communication, a SYNC signal corresponding to the master UE device may be distinguished from the others. For example, when UE device 1 broadcasts a SYNC signal with a relatively high priority of sequence, another UE device may perform a synchronization procedure for the UE device 1. The number and the length of the D2D SYNC signal may set according to the D2D communication area. When a D2D SYNC signal corresponding to the entire range of the values of SFN is created or the number of corresponding SYNC signals is limited, only the SYNC signal codes mapped to the number of SFNs satisfying a condition, i.e., SFN mod=10, such as a unit of 10 SFNs, may be created as shown in FIG. 6. While scanning a corresponding D2D frequency, the UE device determines whether it detects a SYNC signal or a SYNC signal transmitting/receiving period M arrives in operation 703.

When the UE device ascertains that a SYNC signal transmitting/receiving period M arrives in operation 703, it determines whether it has been synchronized in operation 709. When the UE device has not been synchronized in operation 709, it performs the transmission of the SYNC signal in operation 713. On the other hand, when the UE device has been synchronized in operation 709, it determines whether it has transmitted its SYNC signal in the previous D2D synchronization channel in operation 711. This is because, when the UE device is a half-duplex system, it is not capable of simultaneously transmitting and receiving operations. Therefore, a UE device performing D2D communication may perform an alteration transmission process in such a way that it only transmits its D2D SYNC signal in a specific synchronization channel or receives a signal in another D2D synchronization channel. Therefore, when the UE device has not transmitted its SYNC signal in the previous D2D transmitting/receiving period in operation 711, it performs the transmission of the SYNC signal in operation 713. On the other hand, when the UE device has transmitted its SYNC signal in the previous D2D transmitting/receiving period in operation 711, it returns to operation 701 and receives SYNC signals transmitted from the nearby D2D UE devices, while scanning D2D channels.

Meanwhile, when the UE detects a SYNC signal transmitted from another UE device in operation 703, it analyzes/decodes the received SYNC signal in operation 715. The UE device may identify an SFN to which the decoded SYNC signal is mapped. The UE device determines whether the SFN value corresponding to the synchronization code of the received SYNC signal is less than the SFN value of a frame used by the reception UE device in operation 717. When the SFN value corresponding to the synchronization code of the received SYNC signal is less than the SFN value of a frame used by the reception UE device in operation 717, the UE device set its SFN to the SFN value of the received SYNC signal in operation 720. In the SFN agreement procedure, it is assumed that one of the SFN values is selected smaller than the other; however, it should be understood that one of the SFN values is selected greater than other or the SFN value is set to the median of the SFN values, according to agreement rules. The SFN value may also be the previously transmitted SFN of the D2D UE device. As described above, the SFN value may also be set according to the priority of code or sequence of the SYNC signal.

After setting the SFN value to the adjusted SFN value in operation 720, the UE device determines whether D2D synchronization is matched in operation 719. When the current state is a situation where the D2D synchronization has not been ensured in operation 719, the UE adjusts the D2D frame period to adjust the D2D synchronization channel time in order to ensure the D2D synchronization in operation 725. On the other hand, when the current state is a situation where the D2D synchronization has been ensured in operation 719, the UE device proceeds with operation 701 and monitors D2D channels. When the value of the received SFN is greater than the value of the SFN of the UE device or when a setting is made not to update the SFN of the UE device according to the SFN agreement rule, the UE device proceeds with operation 719 and performed the processes described above.

Figure 8:
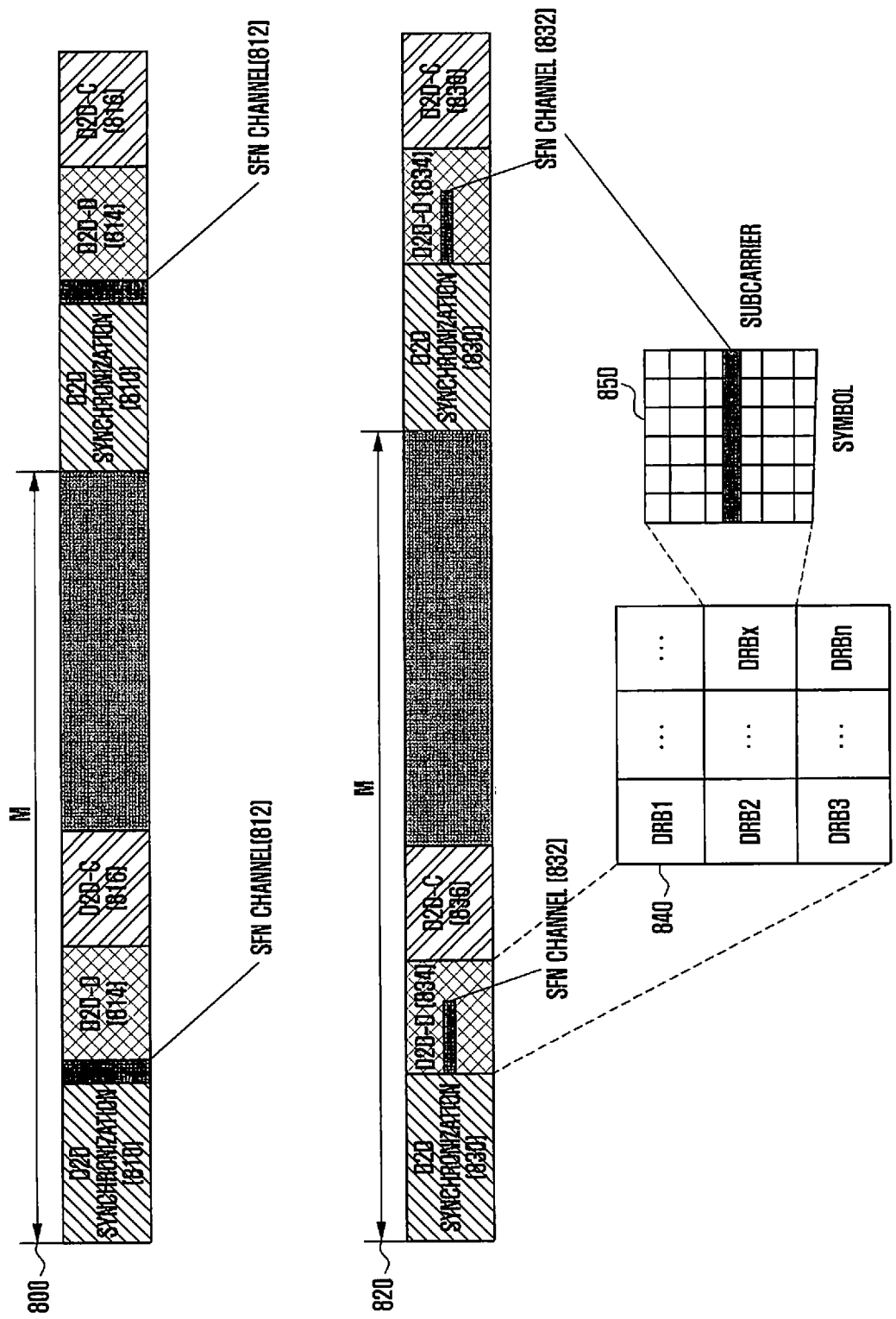
FIG. 8 shows diagrams showing the configuration of resources used for the D2D synchronization according to a third embodiment of the present disclosure.

FIG. 8 shows diagrams showing the configuration of resources used for the D2D synchronization according to a third embodiment of the present disclosure.

Referring to FIG. 8, two examples are shown that create SFN dedicated channels for SFN information exchange after the D2D synchronization procedure has been ended. As described above referring to FIGS. 4 and 6, as the D2D SYNC signal is transmitted/received, the frame synchronization between D2D UE devices may be set. The corresponding S2D synchronization procedure is performed in such a way to transmit/receive a D2D signal between UE devices; adjust a time during which a D2D SYNC signal is transmitted; and synchronize with other UE device. Since a half-duplex UE device does not simultaneously perform the transmission and reception, it alternatively performs the transmission and reception at a periodic SYNC signal and synchronizes with the nearby UE device. For example, when a D2D synchronization signal transmitting period is M and the UE device receives a signal at the M, the synchronization is performed in such a way that the signal is transmitted at 2M. Since the procedure is the same as the embodiments described above, its detailed description is omitted as follows.

Unlike the method of transmitting SFN information included in a D2D SYNC signal or the embodiments of implicitly setting SFNs referring to FIGS. 4 and 6, the embodiment of FIG. 8 is implemented in such a way that SFN channels for transmitting or receiving information regarding SFNs of UE devices are newly allocated. Corresponding SFN channels may be created as resources are allocated on the time domain or frequency domain. An SFN channel is a type of D2D control channel and may contain other information, i.e., information regarding wireless resources for transmission or reception, etc. In the embodiment, the SFN channel refers to a logical channel for transmitting SFN information. The SFN channel may be implemented to be included in a physical channel, or a D2D control channel (PD2DSCH).

Referring to FIG. 8, the first resource structure 800 includes SFN channels 812 as a number of symbol intervals in the time axis. The resource structure 800 may include a D2D synchronization channel 810, an SFN channel 812, a D2D-D channel 814 and a D2D-C channel 816.

In order to transmit the SFN information, the UE device uses the SFN channel 812 provided after the D2D synchronization channel. When the reception UE device does not have its valid SFN, it sets the SFN synchronization by using the received SFN. When the reception UE device participates in currently enabled D2D communication for group communication or in new D2D communication, it may have SFN information that it has used. When the UE device has SFN that has been currently maintained, it transmits the SFN information via the SFN channel 812. When the UE device does not receive a valid SFN from other D2D UE device after the D2D synchronization has been achieved, it transmits newly created SFN information via the SFN channel 812. When the SFN channel 812 does not have sufficient resources for transmission and reception, a half-duplex UE device needs to select one of the transmission and reception operations. This is similar to the case where the D2D SYNC signal is transmitted/received. That is, as shown in FIG. 8, in a state where SFN channels are repeated every a period M, when the UE device transmits the SFN by transmission in the period M, it performs the reception operation at 2*M. When SFN channel resources are sufficient, the SFN channel 812 may be divided into transmission and reception areas. When a correspondent UE device attempts to perform SFN transmission to a specific area, the UE device may attempt to transmit the SFN in the other area. As described above, when the UE device receives SFN information, e.g., different SFN values, from the correspondent UE device, the SFNs are synchronized based on the SFN synchronization rule. For example, in the embodiment referring to FIG. 6, the UE device operates with an SFN that differs from that of the correspondent UE device, it may perform synchronization with a small value of SFN. In a state where UE device 1 operates with SFN=200, when UE device 1 receives SFN=300 from UE device 2, UE device 1 may synchronize with SFN=200. When the UE device has the order of priority of the sequences or codes used in a D2D SYNC signal, it may follow the SFN of a UE device which broadcast a SYNC signal with the highest priority. In addition, in a state where the order of priority is included in an SFN channel and transmitted along with the SFN channel, when a D2D UE device receives the SFN channel, it may set the SFN based on the SFN value and the order of priority corresponding to the SFN value. In addition, the SFN may be set, according to a mutually preset priority rule, based on a location of a wireless resource where the SFN channel is received, i.e., a location of a wireless resource (a subcarrier, a physical radio block (PRB), and time) to which a control channel is allocated. As described above, the SFN synchronization rule may be implemented with various methods. The SFN synchronization rule may be previously set to D2D UE devices or previously received by D2D UE devices from a network. D2D UE devices perform a process of matching the SFN value based on a corresponding rule. In another embodiment, the received SFN value may be a total of 10 bits as an SFN value that has been used. In addition, part of the SFN value is received via an SFN channel and the remaining part may be transmitted implicitly at a synchronization channel period. The value of bits may be set according to a time that SFN is broadcast within a synchronization channel period. For example, when SFN is broadcast four times within a period and a control channel exists, the SFN value may be expressed in two bit (e.g., 00, 01, 10, and 11). Therefore, the total value of SFNs may be 10 bits as the value of SFN received via a control channel is 8 bits and the value of SFN is implicitly calculated as 2 bits according to the order of transmission in control channel containing SFNs. The synchronization channel signal may be transmitted via a D2D Synch channel (D2DSS).

Referring to FIG. 8, the second resource structure 802 creates an SFN channel in the frequency axis. The second resource structure 802 may include a D2D synchronization channel 830, an SFN channel 832, a D2D-D channel 834, and a D2D-C channel 836. When transmitting/receiving a DRB set to perform a D2D scanning process after the D2D synchronization procedure, the UE device receives a corresponding SFN channel 832 and obtains the SFN information regarding the nearby D2D UE device. The arrangement of wireless resources of the D2D-D (scanning) channel 843 is shown as the block diagram 840. Each of the UE devices receives a corresponding DRB set in order to scan the nearby D2D UE devices and determines a corresponding UE device for D2D communication. In addition, the UE device may select a particular DRB and transmit its D2D identifier (D2D_ID) thereto. Therefore, since the nearby D2D UE devices in the communication area where the UE device is may also select the DRB and transmit their DRD_IDs thereto, each DRB contains DRD_IDs transmitted from the nearby D2D UE devices in the same area. The UE device receives the D2D-D channel 834 and creates a communication channel for a corresponding identifier in the D2D-C channel 836, based on the received D2D-D channel 834. As shown in FIG. 8, the DRB 850 is received from a particular UE device via the D2D-C channel during the D2D scanning process. The UE device creates the SFN channel 832 by using a specific subcarrier in a corresponding DRB. Therefore, when receiving a corresponding DRB, the UE device may simultaneously obtain a D2D_ID of a transmission UE device and information regarding SFNs used by the transmission UE device. For D2D communication with individuals, a UE device may perform the SFN synchronization via the D2D scanning process. For group communication, a UE device needs to perform the SFN synchronization procedure based on a number of received SFN information items. When the SFN of a UE device is not synchronized with the nearby D2D UE devices, it performs the SFN synchronization procedure of the embodiments described above. For example, the SFN synchronization may be set based on a small value of SFN as described above. The SFN synchronization of UE devices all of which are synchronized may be performed via the SFN 832. In addition, the SFN synchronization may be set for only a UE device participating in D2D communication.

Figure 9:
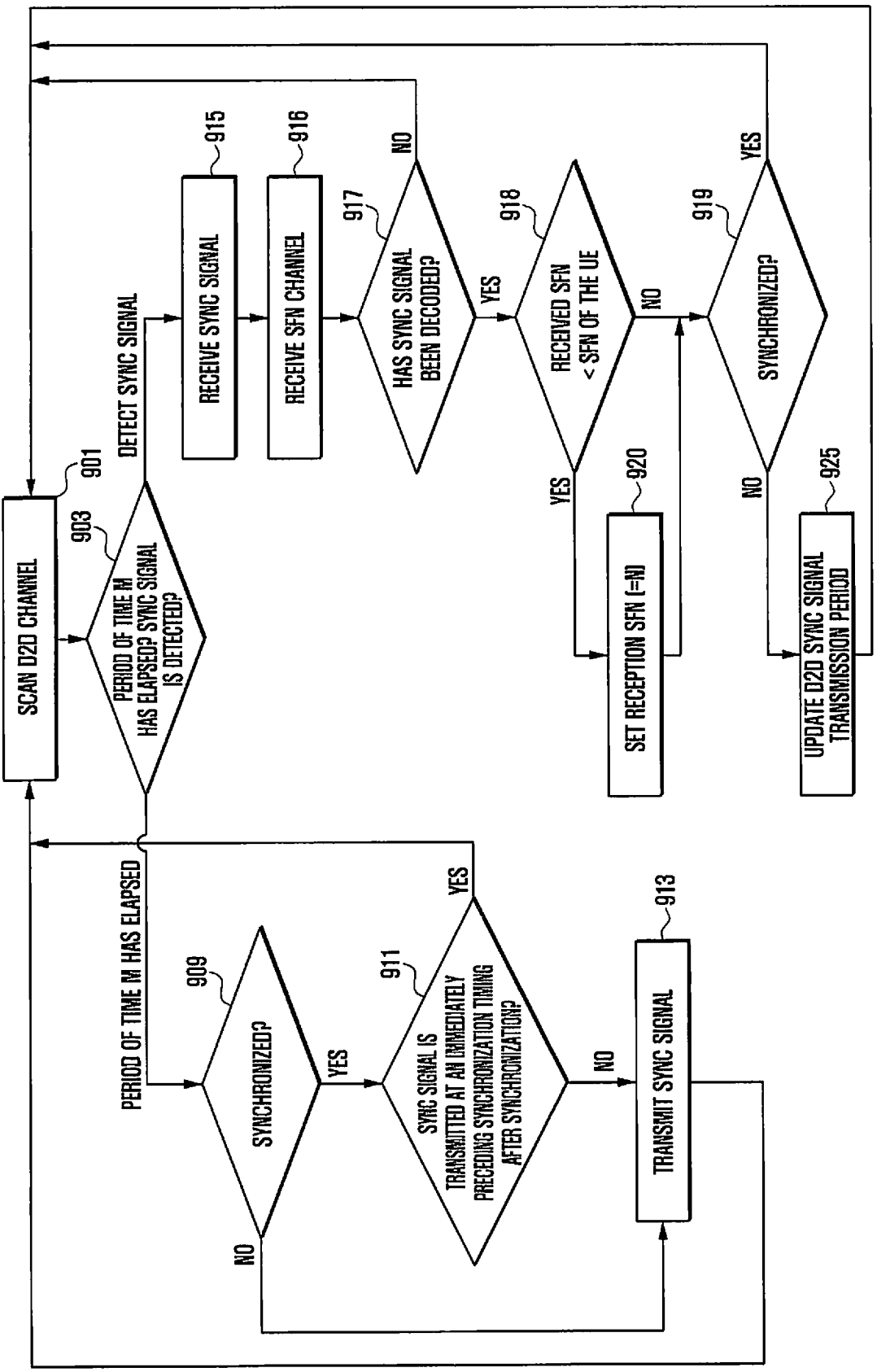
FIG. 9 is a flow diagram showing a synchronization method according to a third embodiment of the present disclosure.

FIG. 9 is a flow diagram showing a synchronization method according to a third embodiment of the present disclosure.

FIG. 9 shows a method of setting an SFN channel for transmitting SFNs related to the embodiment described in FIG. 8. In the embodiment of FIG. 8 showing two examples, one is an example creating an SFN channel including a number of symbols in the time domain and the other is an example allocating a particular subcarrier to an SFN channel in each scanned channel in the D2D scanned block. The flow diagram of FIG. 9 showing the operations of a UE device includes a process similar to the process, describe in the embodiment referring to FIG. 7, for obtaining SFN information mapped to a SYNC signal code. The embodiment of FIG. 9 differs from that of FIG. 7 in that the embodiment of FIG. 9 may have difficulty in obtaining SFN information before the D2D frame synchronization, whereas the embodiment of FIG. 7 can obtain SFN information by receiving a SYNC signal. For example, when a UE device has a number of nearby D2D UE devices that transmit D2D SYNC signals and data respectively, it cannot properly decode data related to a corresponding SFN due to interference.

Operations 901, 903, 909, 911, 913, 915, 918, 919, 920 and 925 in the flow diagram of FIG. 9 are similar to operations 701, 703, 709, 711, 713, 715, 717, 719, 720, and 725 in the flow diagram of FIG. 7, respectively. However, the operations of FIG. 9 differ from those of FIG. 7 as follows.

The UE device processes a SYNC signal received from the synchronization channel and determines the synchronization difference between its D2D frame and the received D2D SYNC signal in operation 915. The UE device receives the SFN channel created according to the embodiment described referring to FIG. 8, in operation 916. The condition as to whether the UE device normally receives SFN information via the SFN channel is related to the extent of coincidence of D2D SYNC signals. For example, when a UE device is not synchronized with the nearby D2D UE devices, the reception performance may be deteriorated because the orthogonality of OFDM is damaged. Therefore, the UE device determines whether it successfully decodes a corresponding SFN channel in operation 917. When the UE device has successfully decoded a corresponding SFN channel in operation 917, it proceeds with operation 918 and then performs the following operations as described in the embodiment of FIG. 7. When the UE device is set to converge to a specific SFN value, it compares the SFN with the specific SNF value and determines whether it synchronizes therebetween. When the D2D frame is not synchronized in operations 918 and 919 or a reception error occurs in the SFN channel in operation 917, the UE device performs the D2D scanning procedure in operation 901.

Figure 10:
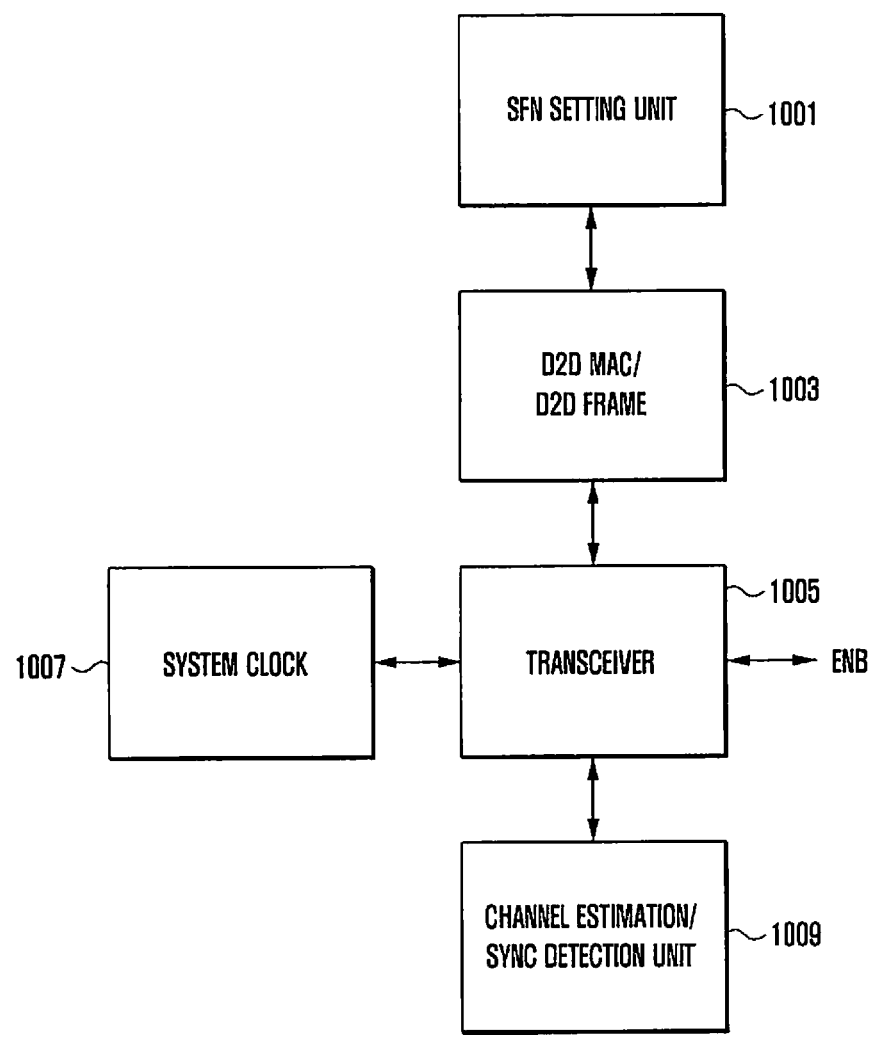
FIG. 10 is a block diagram showing UE according to embodiments of the present disclosure.

FIG. 10 is block diagram showing UE according to embodiments of the present disclosure.

Referring to FIG. 10, the UE device is capable of including a D2D MAC layer 1003 configured to transmit/receive a D2D SYNC signal, a transceiver 1005 for transmitting or receiving a SYNC signal, and a system clock 1007 for operating the transceiver 1005. The UE device may further include a channel estimation/synchronization detection unit 1009 related to the detection performance of SYNC signals. When the UE device receives SYNC signals from the nearby D2D UE devices via the transceiver 1005, the channel estimation/synchronization detection unit 1009 processes the received corresponding signal and determines whether the received signal is a SYNC signal. When the received SYNC signal includes a specific code described in the embodiment referring to FIG. 6, the channel estimation/synchronization detection unit 1009 identifies the synchronization code. After receiving a SYNC signal, each of the UE devices needs to determine whether the D2D frame is synchronized with the SYNC signal. The D2D frame module of the D2D MAC layer 1003 determines whether the current D2D frame is synchronized with the received SYNC signal. When the synchronization is not matched with other D2D signal, the system clock 1007 may stop the system for a certain period of time or the D2D MAC layer 1003 may adjust the time period creating a synchronization channel. The synchronization system by the system clock 1007 is a pulse coupled oscillator (PCO). When the D2D synchronization is matched, the embodiments of FIG. 6 and FIG. 8 perform an SFN information agreement process. In the embodiment of FIG. 4, when the D2D synchronization is matched, the D2D MAC layer 1003 notifies an SFN setting unit 1001 of the matching result of the D2D synchronization, so that the SFN setting unit 1001 sets the corresponding frame to a specific SFN value. The embodiments of FIGS.

6 and 8 may be implemented with a variety of SFN synchronization methods. For example, in order to set the SFN synchronization with the nearby D2D UE devices, using a late SFN, the SFN setting unit 1001 compares the SFN with the received SFN value and sets the FSN of the D2D frame. The SFN setting unit 1001 designates the SFN setup value and transfers it to the D2D MAC layer 1003. The D2D frame of the D2D MAC layer 1003 sets a corresponding SFN value to the SFN of the UE device.

The invention claimed is:

1. A synchronization method of a Device-to-Device (D2D) terminal comprising:
   receiving a synchronization signal from a second D2D terminal;
   identifying whether the D2D terminal is synchronized with the second D2D terminal based on the received synchronization signal;
   establishing a dedicated channel for transmitting information on a system frame number (SFN), in case that the D2D terminal is synchronized with the second D2D terminal; and
   transmitting the information including the SFN via the dedicated channel,
   wherein the second D2D terminal determines whether an SFN value based on the received information is not equal to a specific SFN value, and
   wherein, in case that the SFN value is not equal to the specific SFN value, an SFN value for the second D2D terminal is changed to the SFN value based on the received information.

2. The method of claim 1, further comprising periodically receiving synchronization signals from the second D2D terminal, in case that the D2D terminal is not synchronized with the second D2D terminal.

3. The method of claim 1, wherein the synchronization signal is periodically transmitted at a period of time.

4. A synchronization apparatus of a Device-to-Device (D2D) terminal comprising:
   a transceiver; and
   a controller coupled with the transceiver and configured to control to:
      receive a synchronization signal from a second D2D terminal,
      identify whether the D2D terminal is synchronized with the second D2D terminal based on the received synchronization signal,
      establish a dedicated channel for transmitting information on a system frame number (SFN), in case that the D2D terminal is synchronized with the second D2D terminal, and
      transmit the information including the SFN via the dedicated channel,
   wherein the second D2D terminal determines whether an SFN value based on the received information is not equal to a specific SFN value, and
   wherein an SFN value for the second D2D terminal is changed to the SFN value based on the received information, in case that the SFN value is not equal to the specific SFN value.

5. The apparatus of claim 4, wherein the controller is further configured to periodically receive synchronization signals from the second D2D terminal, in case that the D2D terminal is not synchronized with the second D2D terminal.

6. The apparatus of claim 4, wherein the synchronization signal is periodically transmitted at a period of time.

* * * * *